US008528706B2

(12) United States Patent
Wu

(10) Patent No.: US 8,528,706 B2
(45) Date of Patent: Sep. 10, 2013

(54) MOTOR WITH BRAKING MECHANSIM FOR ACTUATOR

(75) Inventor: Chou-Hsin Wu, New Taipei (TW)

(73) Assignee: Timotion Technology Co., Ltd., New Taipei (TW)

(*) Notice: Subject to any disclaimer, the term of this patent is extended or adjusted under 35 U.S.C. 154(b) by 57 days.

(21) Appl. No.: 13/294,117

(22) Filed: Nov. 10, 2011

(65) Prior Publication Data

US 2012/0305346 A1 Dec. 6, 2012

(30) Foreign Application Priority Data

May 31, 2011 (TW) .............................. 100119122 A

(51) Int. Cl.
F16D 51/00 (2006.01)

(52) U.S. Cl.
USPC ......... 188/77 W; 267/155; 188/67; 192/18 R; 192/70; 192/41 S

(58) Field of Classification Search
USPC ........... 188/77 W, 80, 82.6, 134, 67; 192/26, 192/41 S, 18 R, 70; 267/155
See application file for complete search history.

(56) References Cited

U.S. PATENT DOCUMENTS

| 2,589,830 | A | * | 3/1952 | Lewin | 192/18 R |
| 3,177,996 | A | * | 4/1965 | Bates | 192/35 |
| 3,559,781 | A | * | 2/1971 | Brunelle | 192/12 BA |
| 3,642,106 | A | * | 2/1972 | Baer | 192/70 |
| 3,727,732 | A | * | 4/1973 | Barr | 192/26 |
| 3,915,268 | A | * | 10/1975 | MacDonald | 192/12 BA |
| 4,638,899 | A | * | 1/1987 | Kossett | 192/81 C |
| 4,905,803 | A | * | 3/1990 | Boyd | 192/217.1 |
| 5,150,771 | A | * | 9/1992 | Porter | 188/67 |
| 5,325,950 | A | * | 7/1994 | Kimberlin | 192/41 S |

FOREIGN PATENT DOCUMENTS

| EP | 0662573 B1 | 4/1998 |
| WO | 2004027290 A2 | 4/2004 |

* cited by examiner

Primary Examiner — Christopher Schwartz
(74) Attorney, Agent, or Firm — Chun-Ming Shih; HDLS IPR Services

(57) ABSTRACT

A motor with a braking mechanism for an actuator includes a main body, a rotating shaft and a braking mechanism. The rotating shaft is disposed through the center of the main body. The braking mechanism includes a friction element and a torsion spring, the friction element is arranged on the external periphery of the rotating shaft, and the torsion spring is elastically clamped at an outer edge of the friction element and an end of the torsion spring is fixed to main body. When the rotating shaft rotates in one direction, the torsion spring abuts the friction element to brake and decelerate the rotating shaft. With small wear and tear of the torsion spring, the service life can be extended. With a large contact area between the friction element and the rotating shaft, a good braking effect can be achieved.

19 Claims, 16 Drawing Sheets

MOTOR WITH BRAKING MECHANSIM FOR ACTUATOR

FIELD OF THE INVENTION

The present invention relates to a motor used for a linear actuator, and in particular to a motor with a braking mechanism for the actuator.

BACKGROUND OF THE INVENTION

Linear actuator primarily uses driving components such as a motor, a worm and a worm wheel to drive a lead screw rod, while using the lead screw rod to drive a telescopic pipe installed to the lead screw rod for a linear extension or retraction movement. Since the structure and installation of the linear actuator are simpler and easier than those of pneumatic and hydraulic cylinders, the linear actuator has been used extensively in various equipments such as hospital beds and electric chairs or in any other areas that require extension and retraction operations.

In the conventional linear actuators as disclosed in European Patent Publication No. EP0662573B1 and PCT Publication No. WO2004-027290A2, the linear actuator disclosed in EP0662573B1 comprises: a worm; a lead screw rod; a worm wheel module fixed to an end of the lead screw rod and including a worm wheel; and a torsion spring installed around the external periphery of a cylindrical annulus. In WO2004-027290A2, a thermal conductive element is provided for dissipating heat generated by frictions during the operation of the torsion spring with the annulus.

However, the torsion spring of the conventional linear actuator is fixed, and the cylindrical annulus rotates with the worm wheel, so that heat is generated by frictions produced between the torsion spring and the cylindrical annulus, usually made from plastic and the heat may melt or damage the cylindrical annulus easily, thus reducing the service life significantly. Further, only the linear contact between the torsion spring and the rotating cylindrical annulus is provided for a braking effect or a speed reduction effect, but such a braking effect or a speed reduction effect is limited because the effective contact area between the torsion spring and the ring is small.

In view of the aforementioned drawbacks of the prior art, the inventor of the present invention based on years of experience in the related industry to conduct extensive researches and experiments, and finally provided a feasible solution in accordance with the present invention to overcome the drawbacks of the prior art.

SUMMARY OF THE INVENTION

Therefore, it is a primary objective of the present invention to provide a motor with a braking mechanism for an actuator, wherein a torsion spring is tightly bound around a friction element to brake or decelerate a rotating shaft, so that the tear and wear of the torsion spring can be minimized and the service life of the motor can be extended. In addition, a large contact area between the friction element and the rotating shaft provides a good braking effect.

To achieve the foregoing objectives, the present invention provides a motor with a braking mechanism for an actuator, and the motor comprises a main body, a rotating shaft and a braking mechanism, wherein the rotating shaft is disposed though the center of the main body; the braking mechanism includes a friction element and a torsion spring, and the friction element is arranged on the external periphery of the rotating shaft, and the torsion spring is arranged to elastically clamp the friction element and an end of the torsion spring is fixed to the main body. When the rotating shaft rotates in a direction, the torsion spring forces the friction element to brake or decelerate the rotating shaft.

To achieve the foregoing objectives, the present invention provides a motor with a braking mechanism for an actuator, wherein the actuator includes a base; the motor with the braking mechanism comprises a main body, a rotating shaft and a braking mechanism, and the main body is fixed to the base; the rotating shaft is disposed through the center of the main body and extends into the base; the braking mechanism includes a friction element and a torsion spring; the friction element is arranged on the external periphery of the rotating shaft; and the torsion spring is arranged to elastically clamp an outer edge of the friction element, and an end of the torsion spring is fixed into the base. When the rotating shaft rotates in a direction, the torsion spring forces the friction element to brake or decelerate the rotating shaft.

The present invention has the following effects. In prior art, the cylindrical annulus is driven by the worm wheel to rotate relative to the torsion spring, thus causing problems of frictional losses, heat accumulation, and overheating. The friction element is used in a non-power transmission coupling and essentially the friction element would not follow the rotating shaft for continuous rotation, thus effectively solving the above-mentioned problems in prior art. The braking mechanism installed to the rotating shaft of the motor of the actuator can achieve a better braking effect with a small action force. The friction element and the torsion spring do not produce any relative frictional rotation in between, thus naturally causing no concern of melting the friction element. When the rotating shaft rotates in a specific direction, the damp between the rotating shaft and the friction element is small and will not affect the transmission performance of the motor. In the process of retracting a telescopic pipe, the braking effect and the speed reduction can be achieved. A steady speed is maintained for descending or retracting the telescopic pipe, so as to improve the user's comfort in use. The present invention also has the advantages of a simple structure, a low cost, and a small volume.

DESCRIPTION OF THE PREFERRED EMBODIMENTS

The technical characteristics and contents of the present invention will become apparent with the following detailed description and related drawings. The drawings are provided for the purpose of illustrating the present invention only, but not intended for limiting the scope of the invention.

Figure 1:
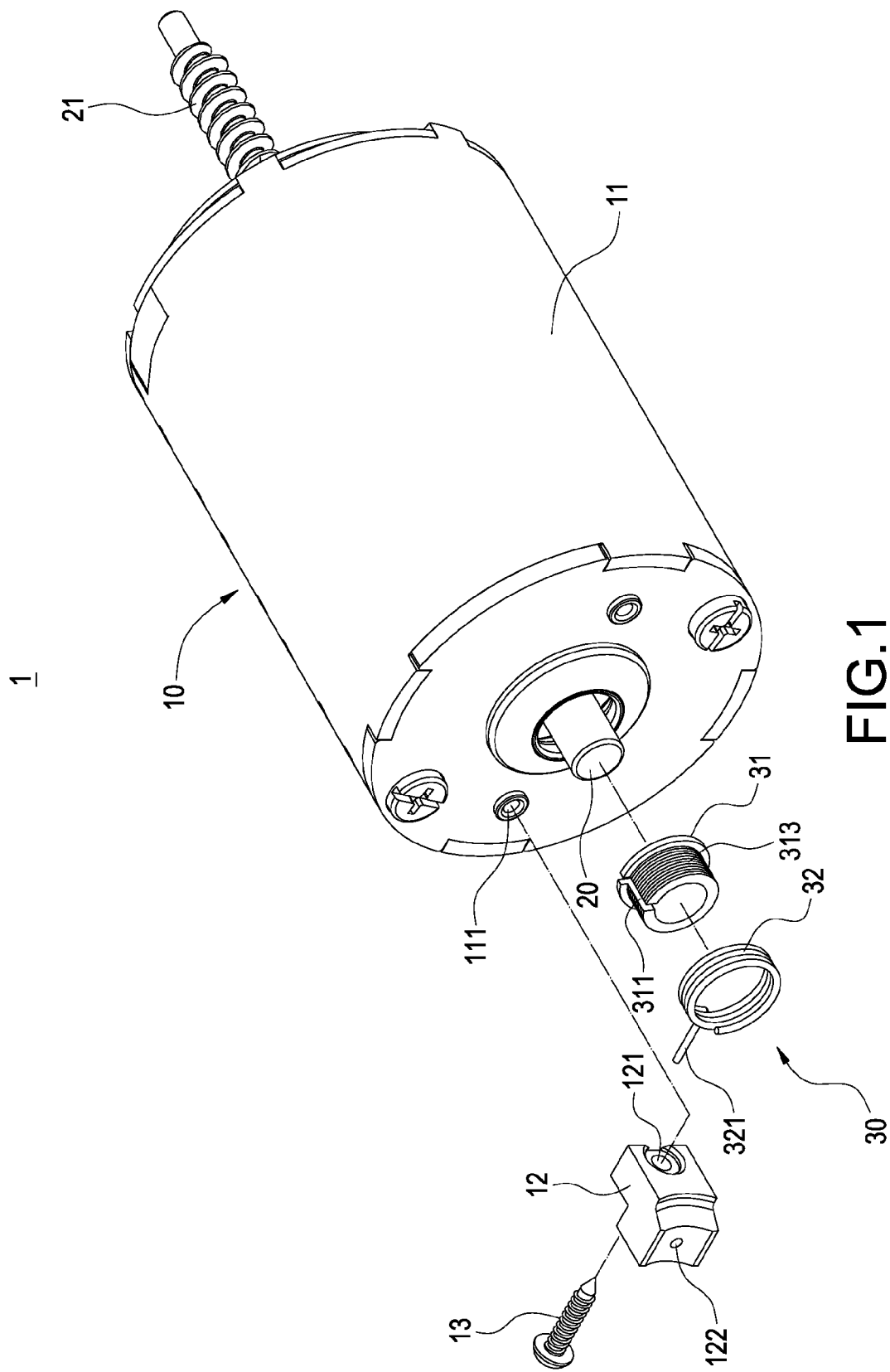
FIG. 1 is an exploded perspective view of a first preferred embodiment of the present invention.
Figure 2:
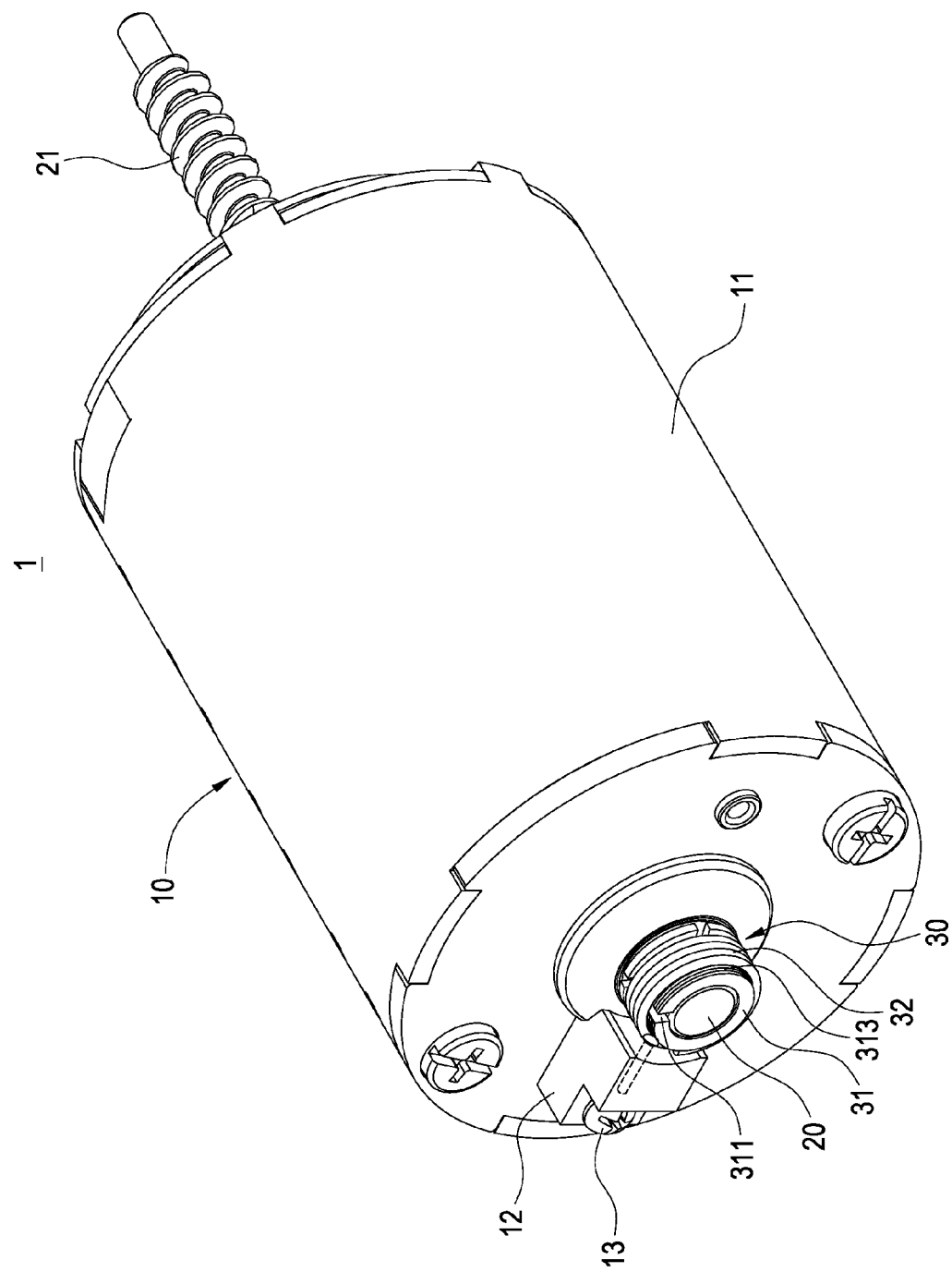
FIG. 2 is a perspective view showing the external appearance of the first preferred embodiment of the present invention.
Figure 3:
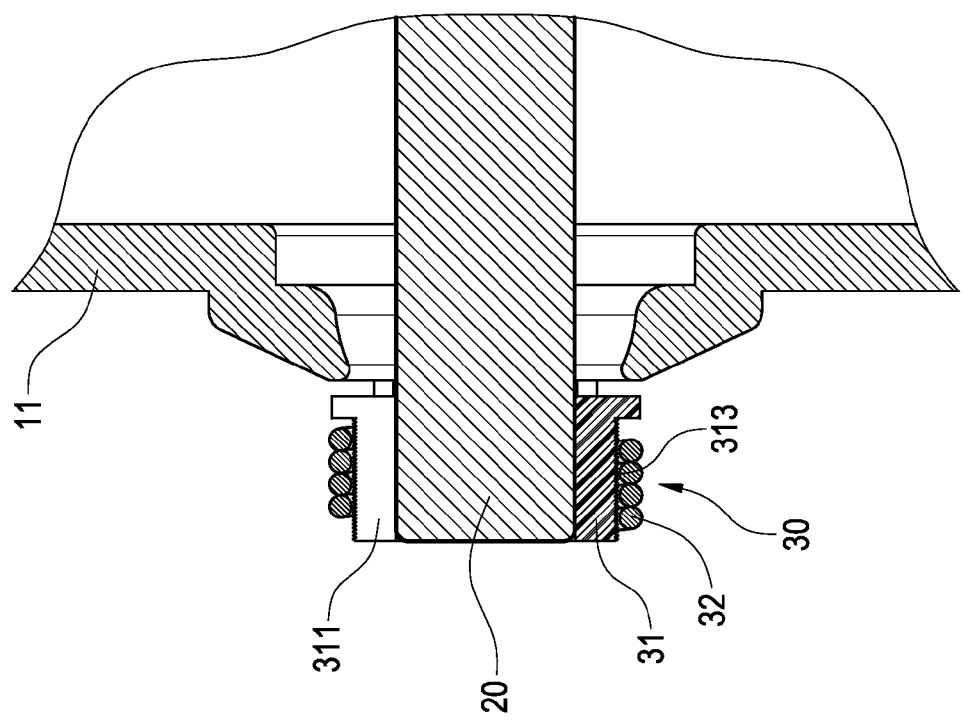
FIG. 3 is a partial cross-sectional view of FIG. 2.

With reference to FIGS. 1 to 3 showing a motor with a braking mechanism for an actuator in accordance with the present invention, the motor 1 comprises a main body 10, a rotating shaft 20 and a braking mechanism 30.

The main body 10 comprises a cylindrical casing 11, components such as a rotor, a stator and a coil (not shown in the figure) contained in the casing 11, and a plurality of screw holes 111 formed at a rear end surface of the casing 11. The main body 10 of this preferred embodiment further comprises a fastening element 12 substantially in a stepped shape and having a through hole 121 and an insertion hole 122 formed thereon, and the through hole 121 is provided for allowing a screw element 13 to threadedly connected into the screw hole 111 to combine the fastening element 12 with the casing 11.

The rotating shaft 20 is disposed through the central position of the main body 10, and both ends of the rotating shaft 20 extend outwards from the casing 11, and a worm rod 21 is formed at an end of the rotating shaft 20.

The braking mechanism 30 includes a friction element 31 and a torsion spring 32. The friction element 31 of this preferred embodiment is made of metal or plastic and substantially in the shape of a circular ring, and a cut groove 311 is formed on the circular ring for producing a contraction in a radial direction of the friction element 31 when the friction element 31 is elastically clamped by the torsion spring 32. In addition, a coarse pattern 313 is formed on the external surface of the friction element 31, such that when the torsion spring 32 is arranged on the coarse pattern 313, an axial movement of each spring coil can be restrained, and a retaining force between the torsion spring 32 and the friction element 31 can be increased. The friction element 31 is arranged on the external periphery of the rotating shaft 20. The torsion spring 32 can be a right-hand rotating torsion spring, so that when the rotating shaft 20 rotates counterclockwise, the torsion spring 32 produces a contraction in a radial direction. On the other hand, when the rotating shaft 20 rotates clockwise, the torsion spring 32 produces an expansion in a radial direction. In this preferred embodiment, the torsion spring 32 includes a positioning arm 321, and the torsion spring 32 is arranged to elastically clamp on the external periphery of the friction element 31 in such a manner that the positioning arm 321 of the torsion spring 32 is inserted into the insertion hole 122 and fixed thereto.

Figure 4:
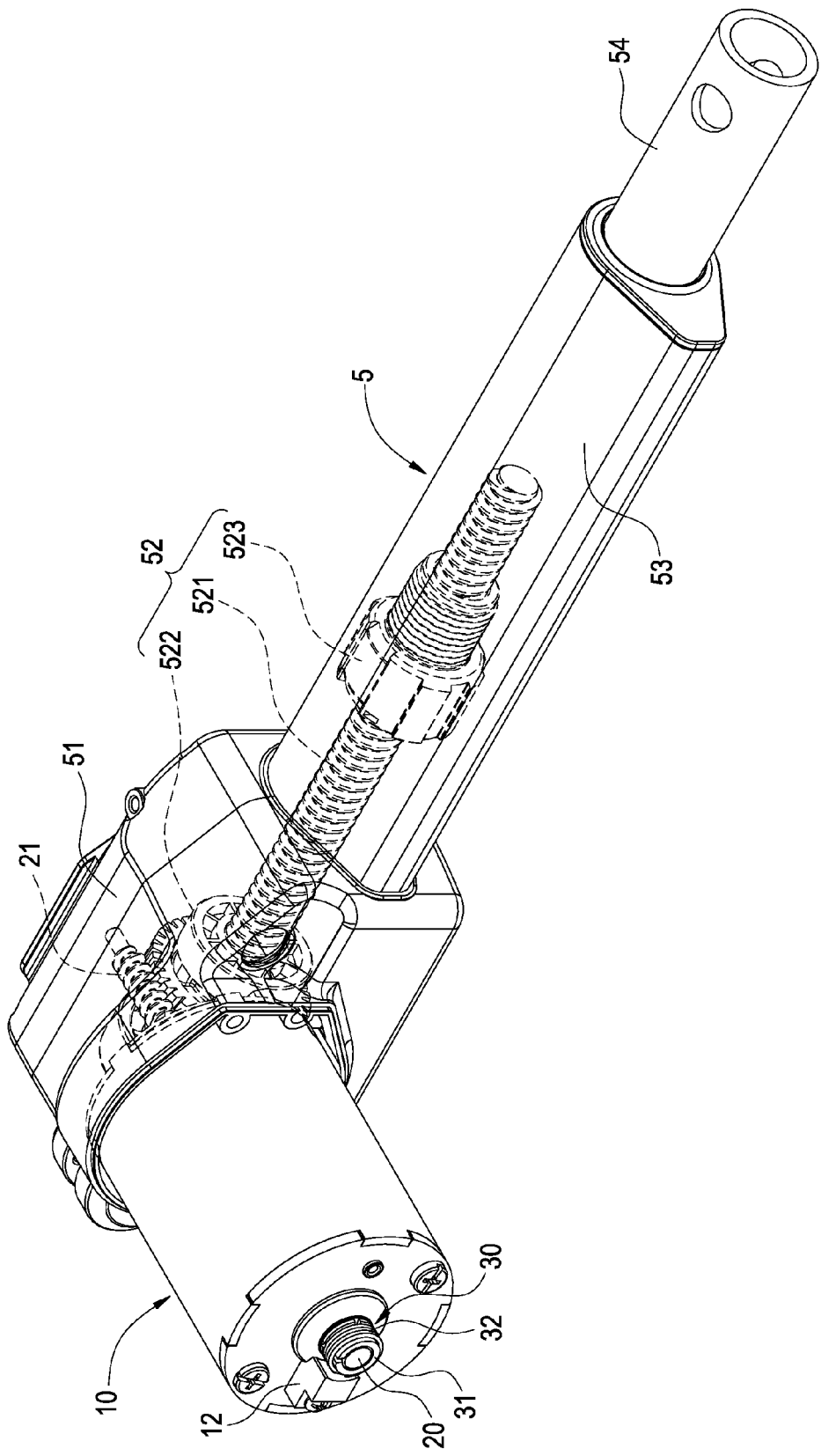
FIG. 4 is a schematic view showing the operation of the first preferred embodiment of the present invention applied in a linear actuator.

With reference to FIG. 4, the motor 1 of the present invention is installed to a linear actuator 5, and the linear actuator 5 comprises a base 51, a transmission mechanism 52, an outer pipe 53, a telescopic pipe 54 and other components. The transmission mechanism 52 includes a lead screw rod 521, a worm wheel 522, a nut 523 and other components, wherein an end of the outer pipe 53 is fixed to the base 51, and an end of the lead screw rod 521 is disposed inside the base 51 and the other end of the lead screw rod 521 is disposed into the outer pipe 53. The worm wheel 522 is fixed to the lead screw rod 521 and disposed in the base 51. An end of the telescopic pipe 54 and the nut 523 are coupled with each other, and the other end of the telescopic pipe 54 pierces the outer pipe 53, and the nut 523 and the lead screw rod 521 are threadedly connected to each other to achieve the transmission effect. An end of the motor 1 of the present invention is fixed to the base 51, and the worm rod 21 of the rotating shaft 20 is engaged with the corresponding worm wheel 522 to achieve the transmission effect, so as to constitute the linear actuator 5.

When in use, the rotating shaft 20 is driven by the components inside the main body 10 to produce a rotation. When the worm wheel 522 is driven by the worm rod 21 to rotate clockwise, the lead screw rod 521 drives the telescopic pipe 54 to retract into the outer pipe 53, and an end of the torsion spring 32 fixed and tightly bounded with the friction element 31 can produce a contraction in a radial direction, and the elasticity of the torsion spring 32 provides an elastic clamping force and the friction effect between the internal wall of the friction element 31 and the surface of the rotating shaft 20 to decelerate the rotating speed of the rotating shaft 20 and the lead screw rod 521. Therefore, when the linear actuator 5 is installed to an electric bed or a chair, the speed for the telescopic pipe 54 to retract into the outer pipe 53 is slower, so as to improve the comfort of the user.

On the other hand, when the worm wheel 522 is driven by the worm 21 to rotate counterclockwise, the lead screw rod 521 drives the telescopic pipe 54 to extend out of the outer pipe 53, and the rotating shaft 20 rotates in a direction opposite to the rotating direction of the torsion spring 32, such that the rotating shaft 20 drives the friction element 31 to expand the torsion spring 32 in a radial direction. Now, the friction element 31 is released to reduce the friction damping caused by the rotation of the rotating shaft 20, so that the rotating shaft 20 can rotate easily inside the friction element 31 without affecting the transmission performance of the motor 1.

Figure 5:
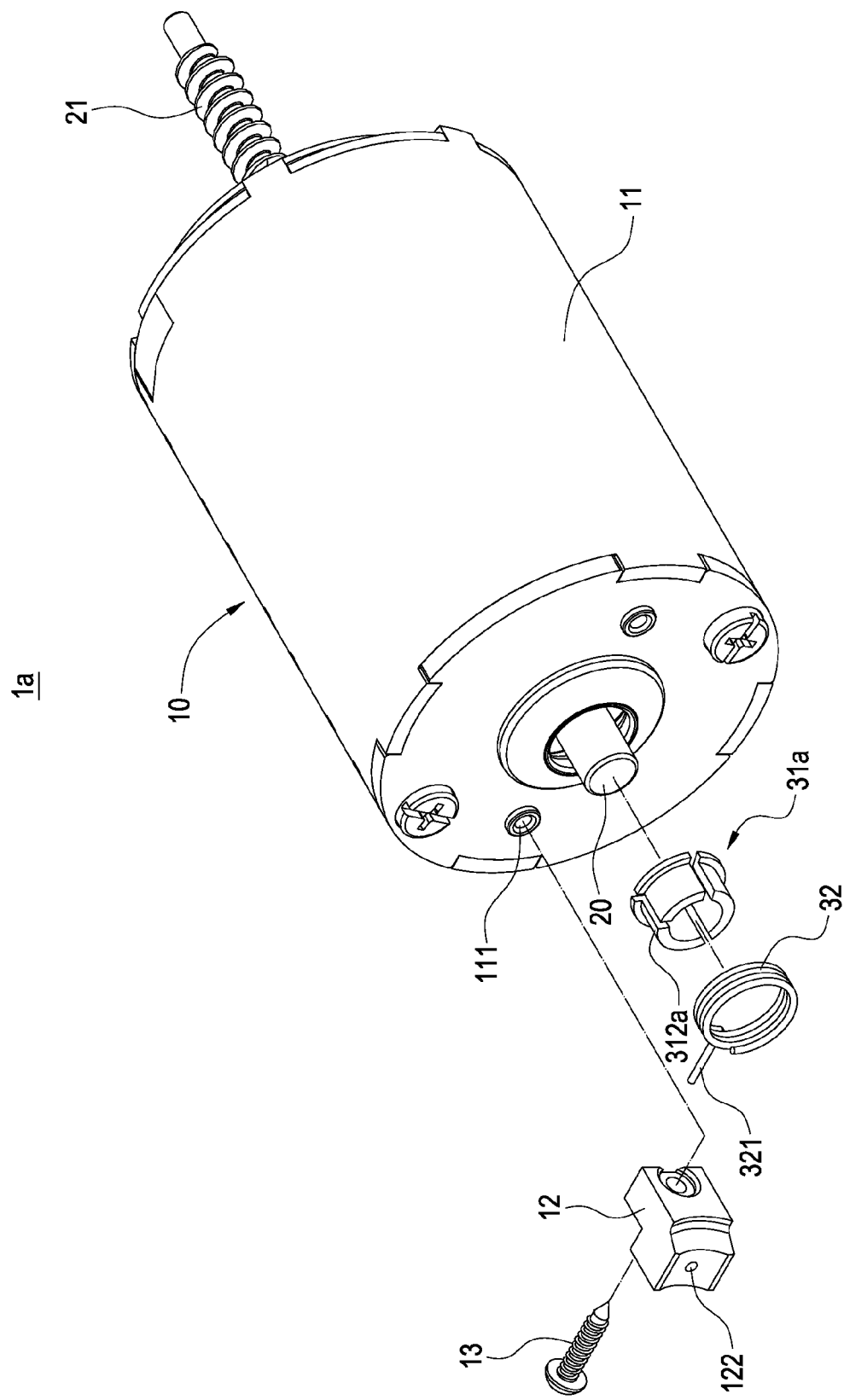
FIG. 5 is an exploded perspective view of a second preferred embodiment of the present invention.

With reference to FIG. 5 showing a motor in accordance with the second preferred embodiment of the present invention, the main difference between the motor 1a of this preferred embodiment and the motor 1 of the first preferred embodiment lies in that the friction element 31a is comprised of three arc plates 312a that are combined into a substantially circular ring. The invention is not limited to such arrangement only, but any friction element comprised of two or more arc plates 312a can be used in the present invention. Each arc plate 312a is arranged on the external periphery of the rotating shaft 20. The torsion spring 32 is elastically arranged on the external periphery of the three arc plates 312a, and the positioning arm 321 of the torsion spring 32 is inserted into the insertion hole 122.

Figure 6:
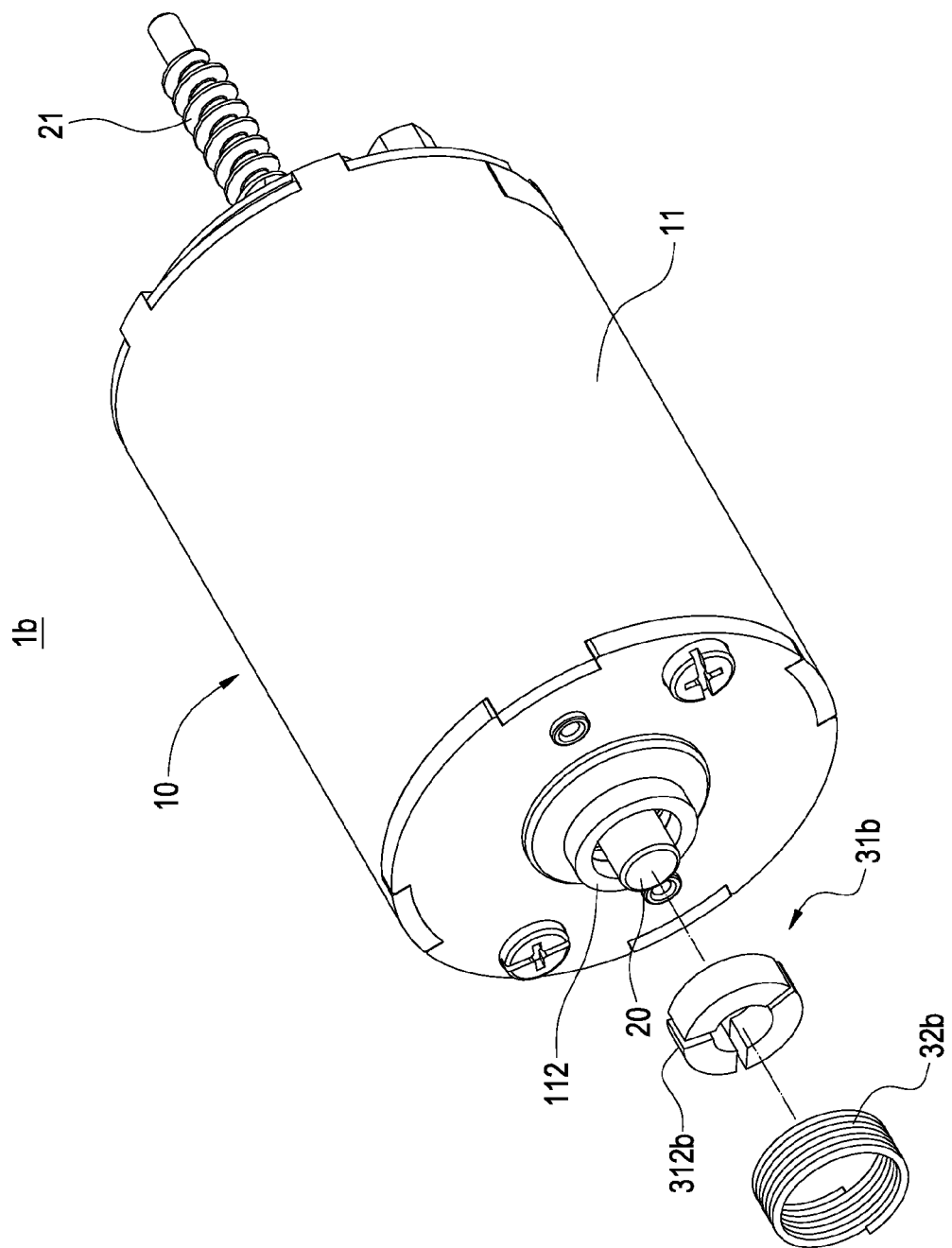
FIG. 6 is an exploded perspective view of a third preferred embodiment of the present invention.

With reference to FIG. 6 showing a motor in accordance with the third preferred embodiment of the present invention, the main difference between the motor 1b of this preferred embodiment and the motor of the foregoing preferred embodiment lies in that the friction element 31b is comprised of three arc plates 312b, and a protruding ring 112 extends from a distal surface of the casing 11, and each arc plate 312b is arranged on the external periphery of the rotating shaft 20. A portion of the torsion spring 32b is tightly arranged on the protruding ring 112, and another portion is elastically arranged on each arc plate 312b.

Figure 7:
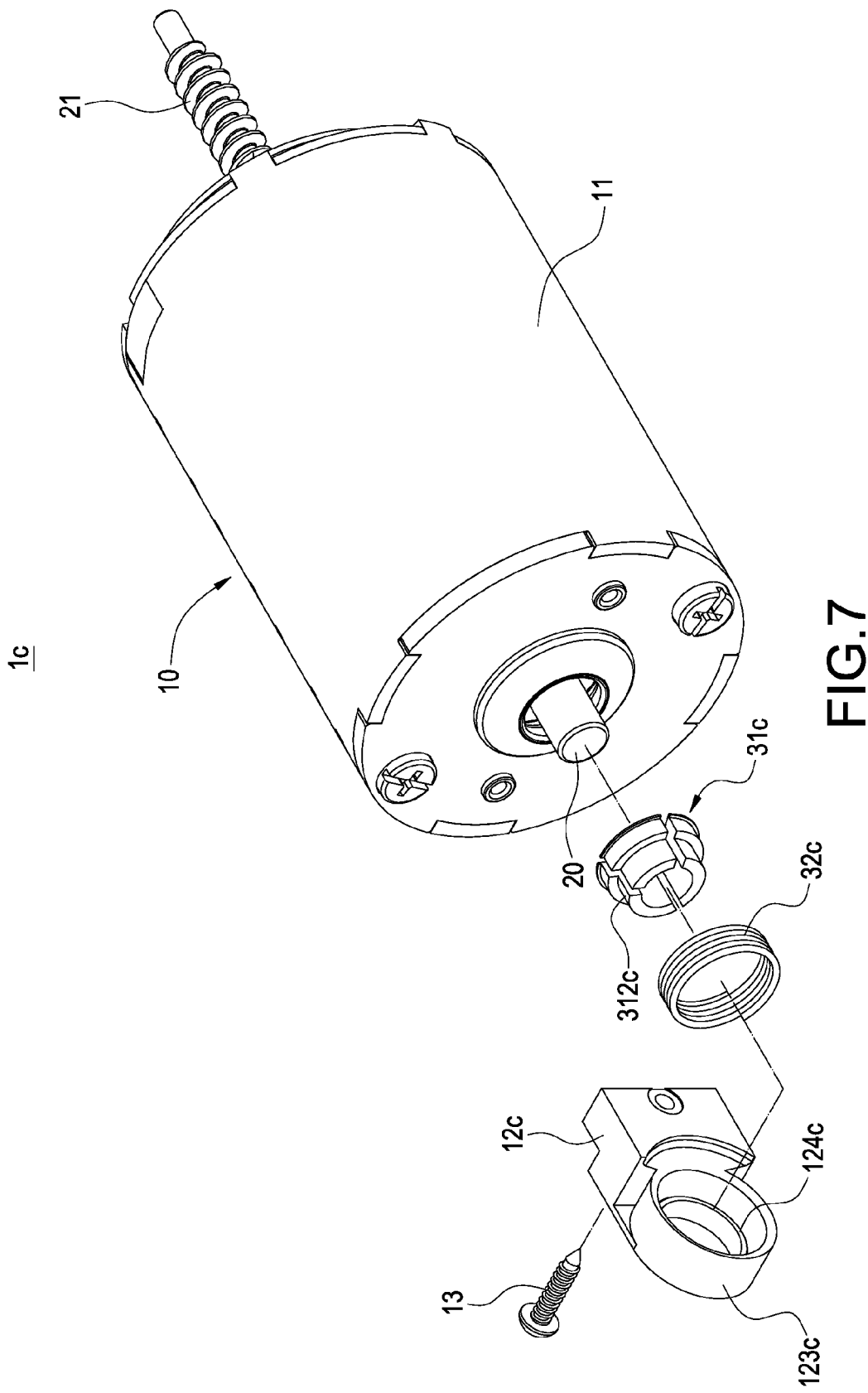
FIG. 7 is an exploded perspective view of a fourth preferred embodiment of the present invention.
Figure 8:
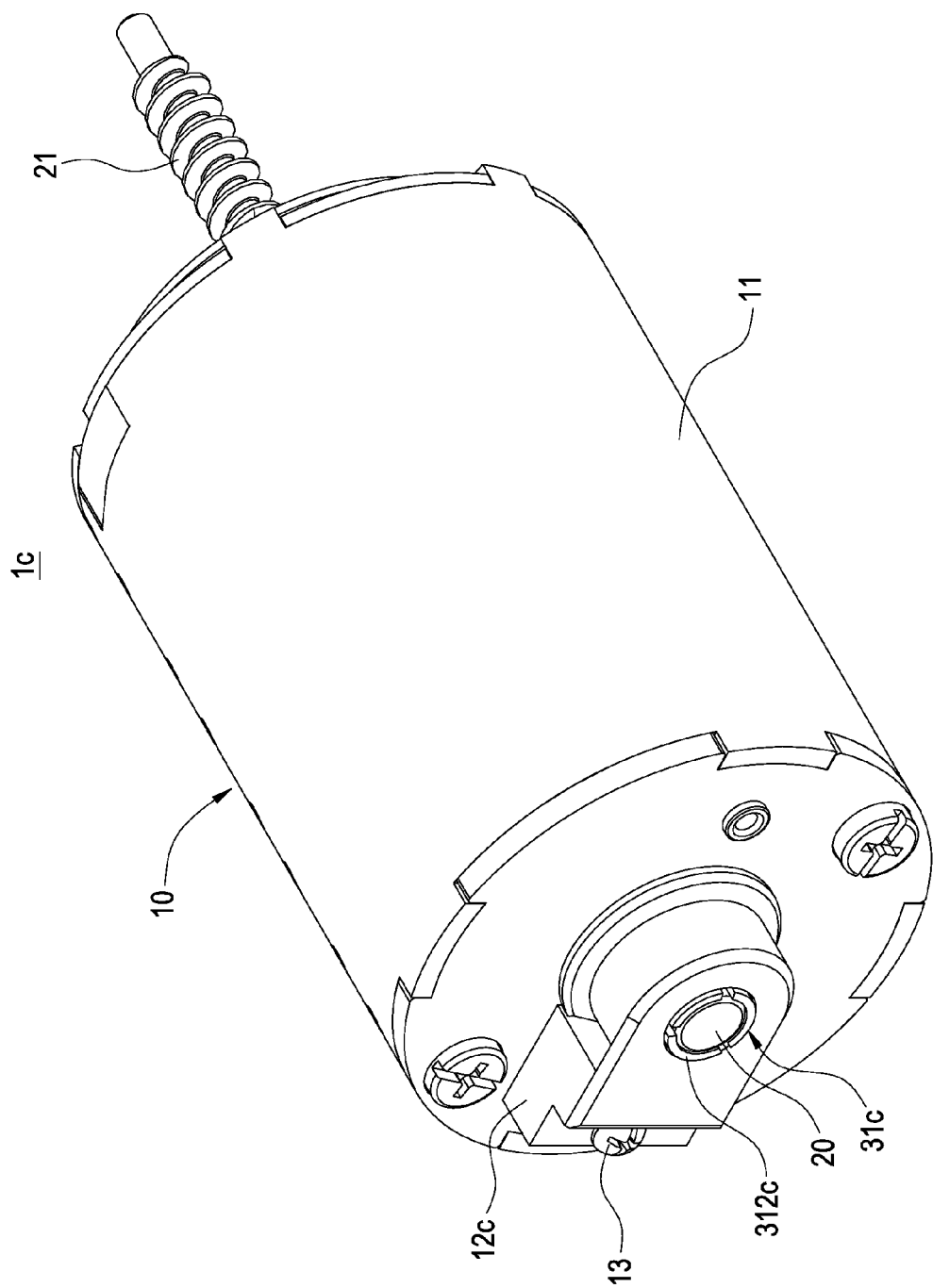
FIG. 8 is an assembled view showing the external appearance of the fourth preferred embodiment of the present invention.
Figure 9:
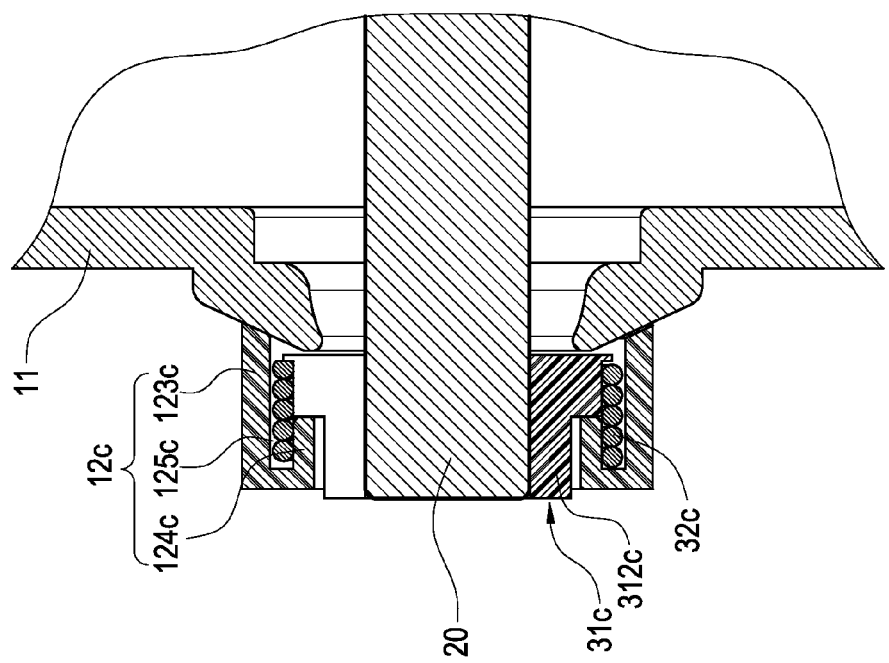
FIG. 9 is a partial cross-sectional view of FIG. 8.

With reference to FIGS. 7 to 9 showing a motor in accordance with the fourth preferred embodiment of the present invention, the main difference between the motor 1c of this preferred embodiment and the motor of the foregoing preferred embodiment lies in that the friction element 31c is comprised of three stepped arc plates 312c. Similarly, the friction element 31c can be a structure with two stepped arc plates 312c. The fastening element 12c is comprised of an outer ring 123c, an inner ring 124c coupled to and formed inside the outer ring 123c, and a groove passage 125c formed between the outer ring 123c and the inner ring 124c, and each arc plate 312c is arranged on the external periphery of the rotating shaft 20. A portion of the torsion spring 32c is contained in the groove passage 125c and tightly arranged on the external periphery of the inner ring 124c, and another portion of the torsion spring 32c is elastically arranged on a large-diameter external periphery of each arc plate 312c (as shown in FIG. 9).

Figure 10:
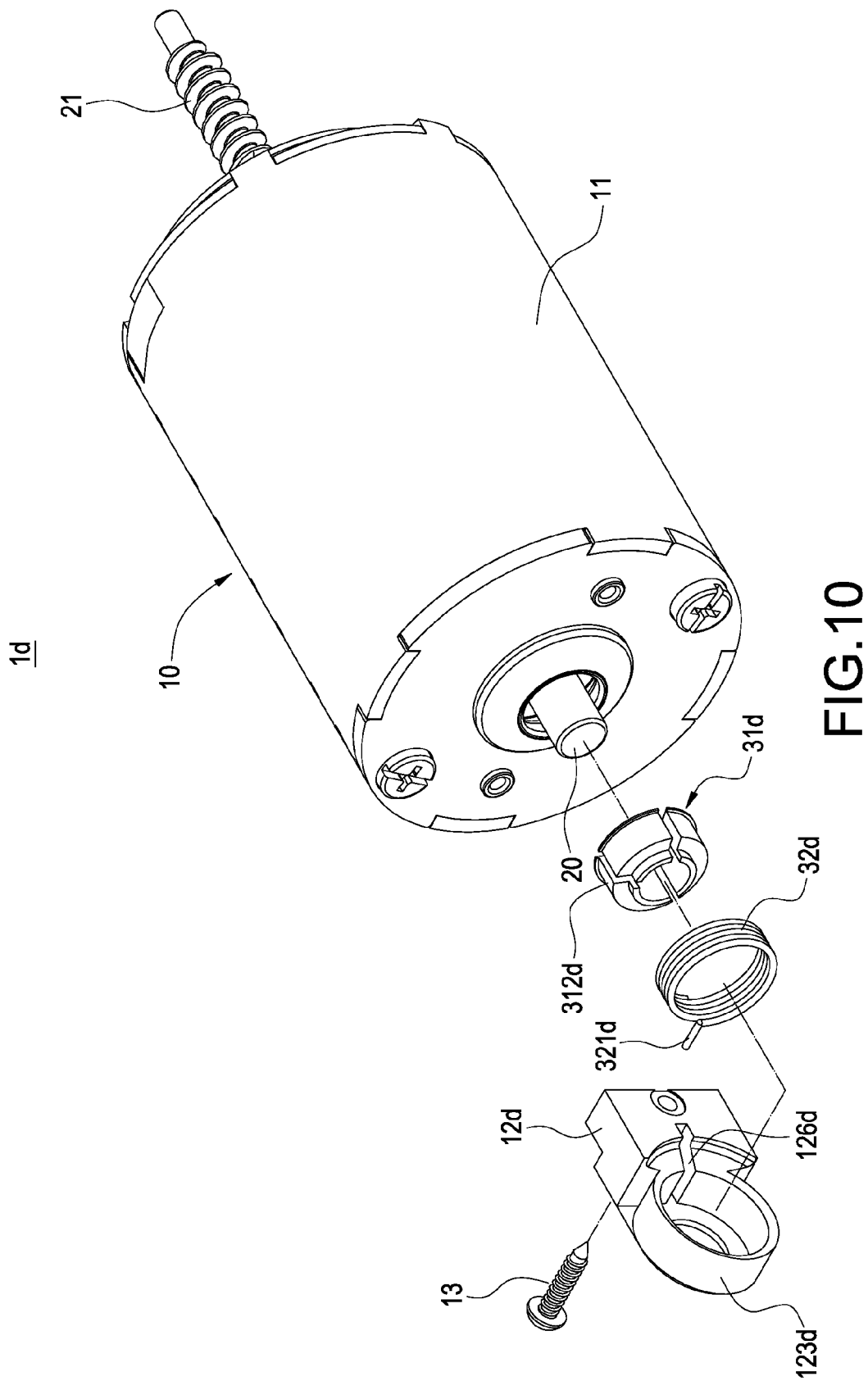
FIG. 10 is an exploded perspective view of a fifth preferred embodiment of the present invention.
Figure 11:
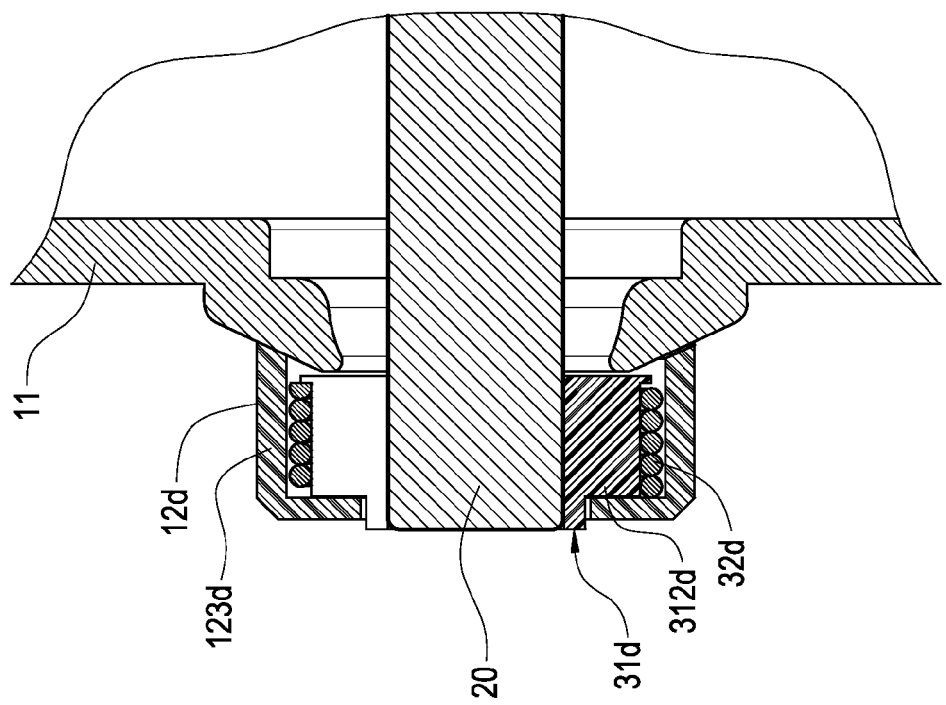
FIG. 11 is a partial cross-sectional view of FIG. 10.

With reference to FIGS. 10 and 11 showing a motor in accordance with the fifth preferred embodiment of the present invention, the main difference between the motor 1d of this preferred embodiment and the motor of the foregoing preferred embodiment lies in that the friction element 31d is comprised of three stepped arc plates 312d, and the fastening element 12d has an outer ring 123d, and the fastening element 12d has a slot 126d formed therein, and each arc plate 312d is arranged on the external periphery of the rotating shaft 20, and the torsion spring 32d is elastically arranged on the external periphery of the three arc plates 312d and contained in the outer ring 121d, and the positioning arm 321d of the torsion spring 32d is fixed into the slot 126d (as shown in FIG. 11).

Figure 12:
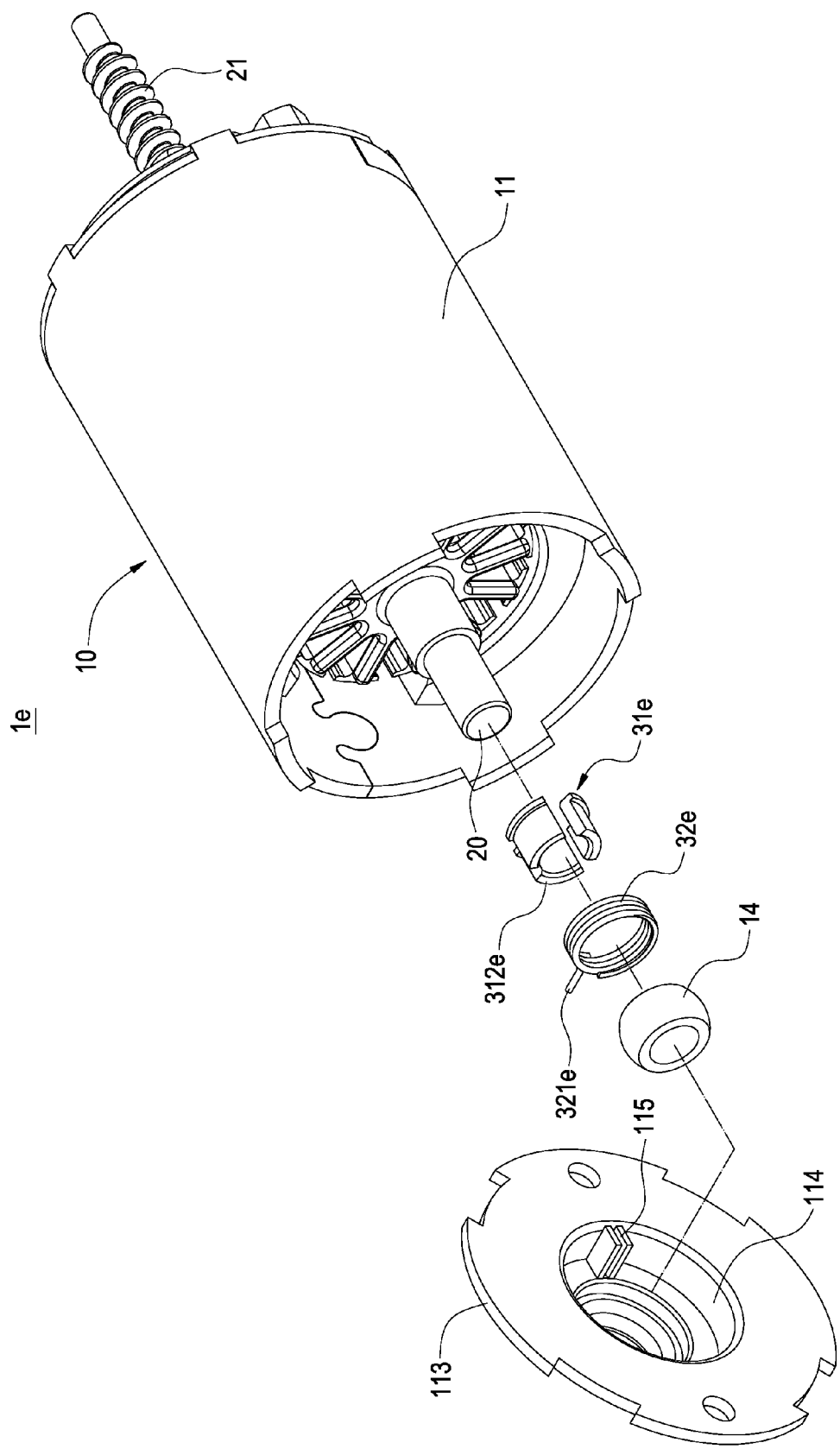
FIG. 12 is an exploded perspective view of a sixth preferred embodiment of the present invention.
Figure 13:
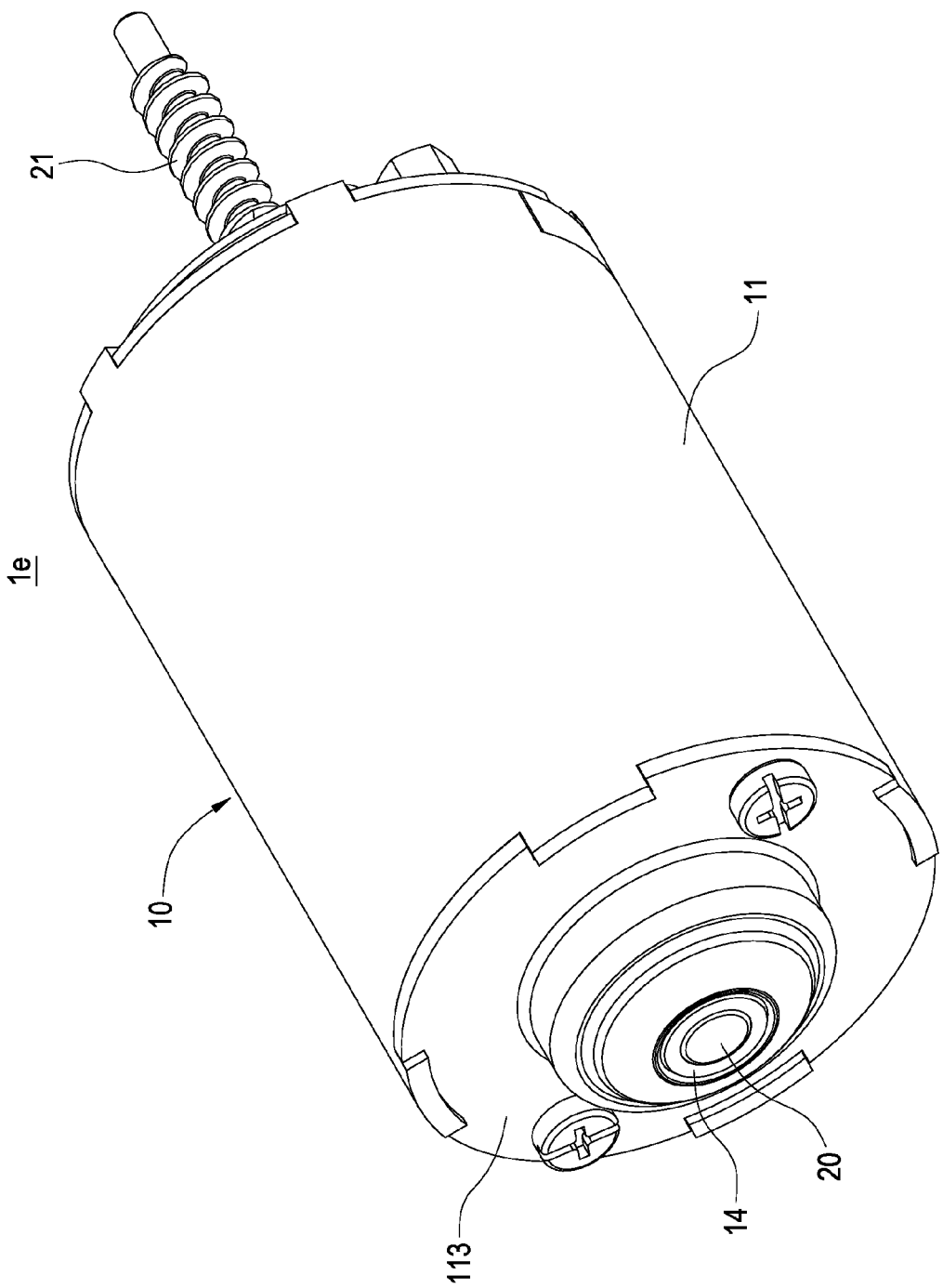
FIG. 13 is an assembled view of the sixth preferred embodiment of the present invention.
Figure 14:
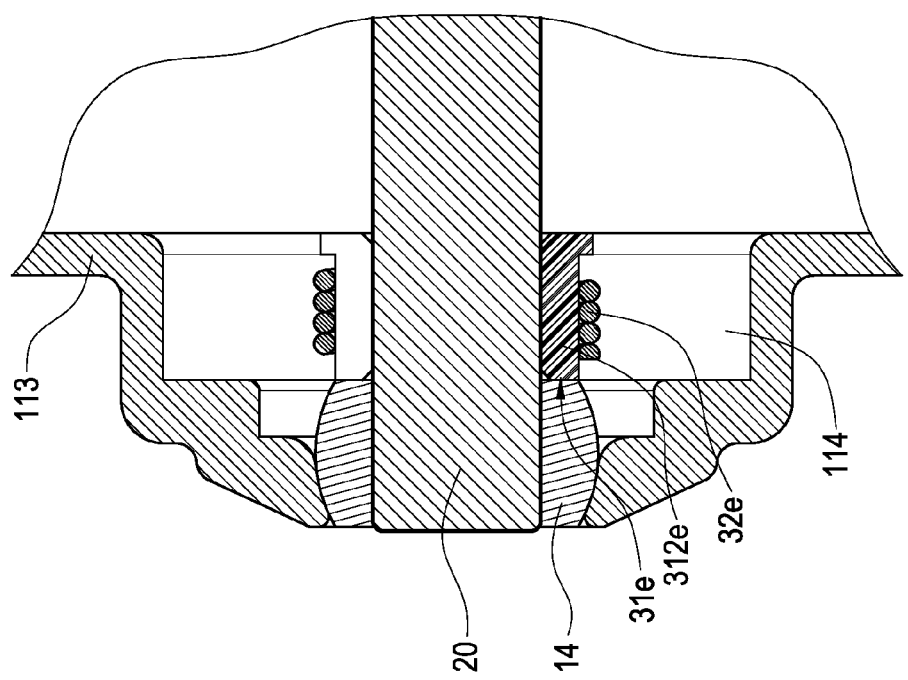
FIG. 14 is a partial cross-sectional view of FIG. 13.

With reference to FIGS. 12 and 14 showing a motor in accordance with the sixth preferred embodiment of the present invention, the main difference between the motor 1e of this preferred embodiment and the motor of the foregoing preferred embodiment lies in that the friction element 31e is also comprised of three arc plates 312e, and the casing 11 has a accommodating chamber 114 formed inside an end cover 113 and an insertion slot 115 formed in the accommodating chamber 114, and the friction element 31e and the torsion spring 32e are installed in the accommodating chamber 114, and each arc plate 312e is arranged on the external periphery of the rotating shaft 20. The torsion spring 32e is elastically arranged on the external periphery of the three arc plates 312e, and the positioning arm 321e of the torsion spring 32e is fixed into the insertion slot 115 (as shown in FIG. 14). In addition, a restricting sleeve 14 is provided for abutting and positioning the friction element 31e, wherein the restricting sleeve 14 may prevent moisture or dusts outside the casing 11 from being stuck or attached onto the friction element 31e and the torsion spring 32e.

Figure 15:
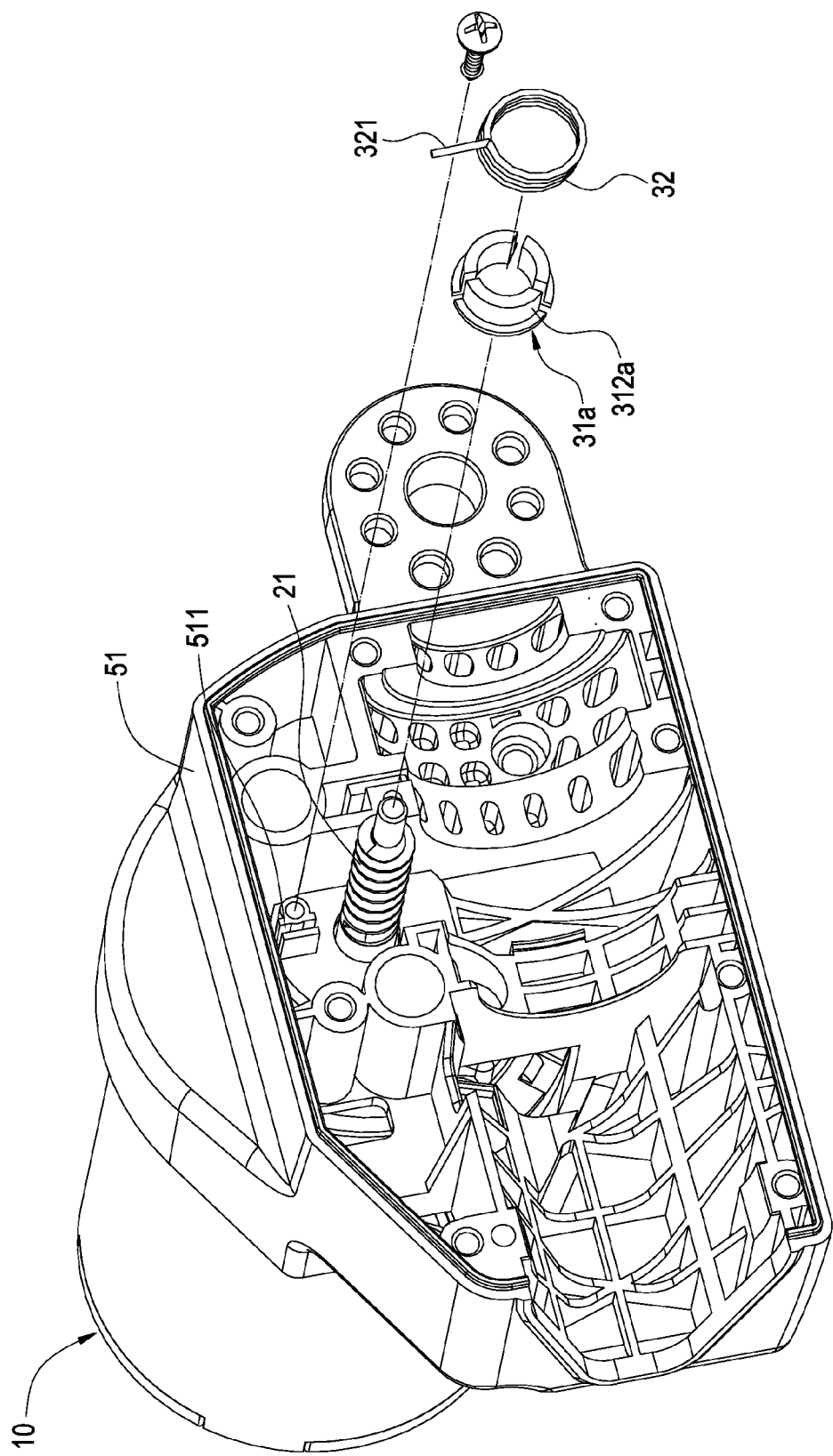
FIG. 15 is an exploded perspective view of a seventh preferred embodiment of the present invention and an actuator.
Figure 16:
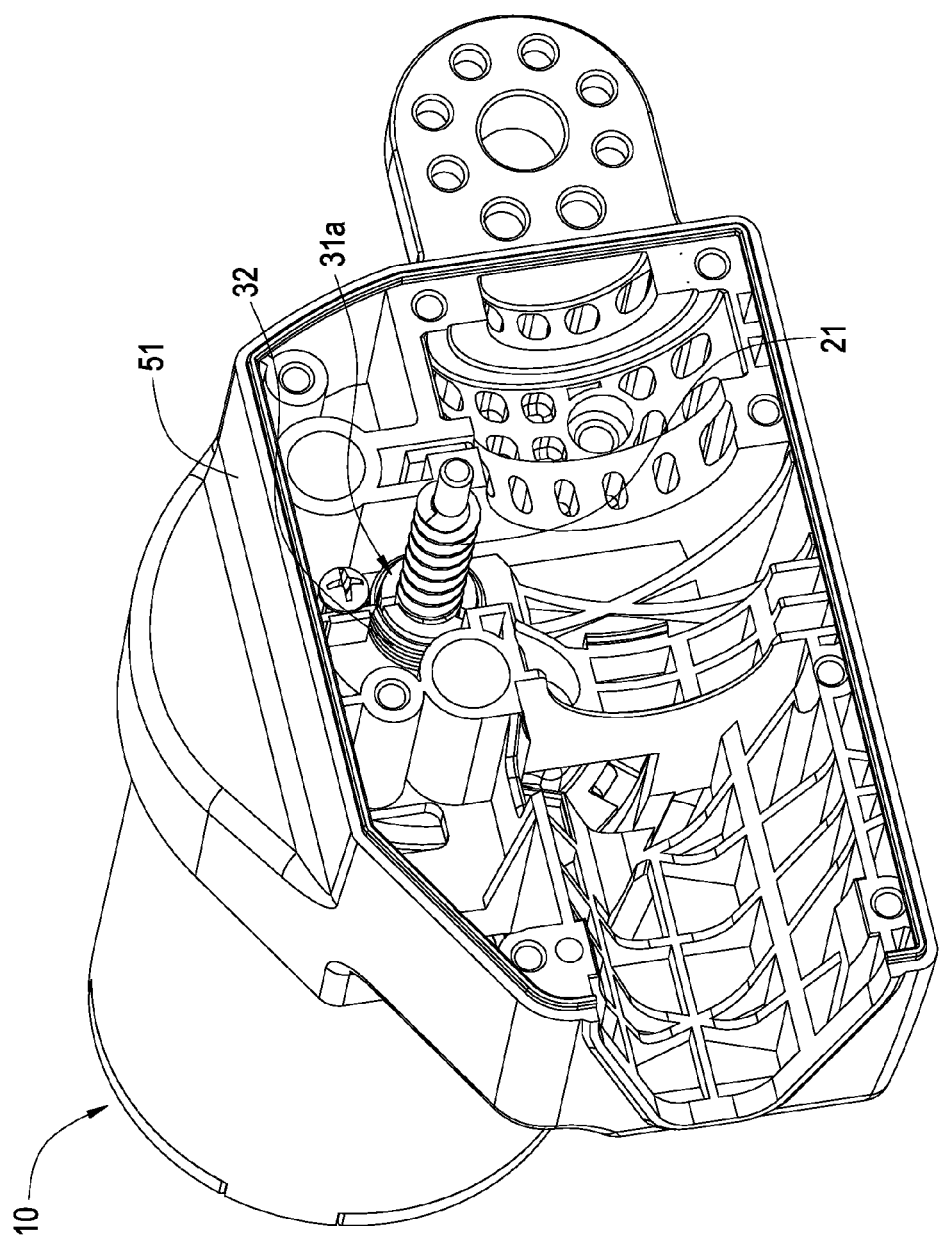
FIG. 16 is an assembled view of the seventh preferred embodiment of the present invention and an actuator.

With reference to FIGS. 15 and 16 showing a motor in accordance with the seventh preferred embodiment of the present invention, the main difference between the motor 1f of this preferred embodiment and the motor of the foregoing preferred embodiment lies in that each arc plate 312a of the friction element 31a is arranged on the external periphery of the rotating shaft 20 at an internal end of the worm rod 21 (as shown in FIG. 16). The torsion spring 32 is elastically arranged on the external periphery of the three arc plates 312e. In addition, a positioning slot 511 is formed in the base 51, and the positioning arm 321 of the torsion spring 32 is fixed into the positioning slot 511.

In summation of the description above, the motor with a braking mechanism for actuators of the present invention can achieve the expected objectives and improve over the prior art, and comply with the patent application requirements, and is thus duly filed for patent application.

While the invention has been described by means of specific embodiments, numerous modifications and variations could be made thereto by those skilled in the art without departing from the scope and spirit of the invention set forth in the claims.

What is claimed is:

1. A motor for a linear actuator, comprising:
a main body;
a rotating shaft disposed through a center of the main body; and
a braking mechanism including a friction element and a torsion spring, the friction element being fixedly arranged on the external periphery of rotating shaft, the torsion spring being arranged to elastically clamp the friction element and an end of the torsion spring being fixed to the main body;
wherein the torsion spring forces the friction element to brake and decelerate the rotating shaft by a friction effect between an internal surface of the friction element and a corresponding external surface of the rotating shaft in a radial direction when the rotating shaft rotates in one direction.

2. The motor for a linear actuator as recited in claim 1, wherein the friction element includes a cut groove formed thereon.

3. The motor for a linear actuator as recited in claim 1, wherein the friction element is comprised of two or more arc plates.

4. The motor for a linear actuator as recited in claim 1, wherein the friction element is comprised of two or more stepped arc plates.

5. The motor for a linear actuator as recited in claim 1, wherein the friction element includes a coarse pattern formed on its external surface, and the torsion spring is arranged on the coarse pattern.

6. The motor for a linear actuator as recited in claim 1, wherein the friction element drives the torsion spring to expand in the radial direction when the rotating shaft rotates in another direction.

7. The motor for a linear actuator as recited in claim 1, wherein the main body includes a casing, both ends of the rotating shaft extend outward from an external side surface at an end of the casing.

8. The motor for a linear actuator as recited in claim 7, wherein the main body further includes a fastening element installed in the casing and disposed on one side of the rotating shaft, and the fastening element includes an insertion hole formed thereon, a positioning arm extends from the torsion spring, and the positioning arm is disposed through the insertion hole.

9. The motor for a linear actuator as recited in claim 7, wherein the casing includes a protruding ring extending from a distal side of the casing and formed at the external periphery of the rotating shaft, a portion of the torsion spring is forcibly arranged on the protruding ring, and another portion of the torsion spring is elastically arranged on the friction element.

10. The motor for a linear actuator as recited in claim 7, wherein the main body further comprises a fastening element installed in the casing and disposed on one side of the rotating shaft, the fastening element includes an outer ring, an inner ring formed inside the outer ring and coupled to the outer ring, and a groove passage formed between the outer ring and the inner ring, a portion of the torsion spring is contained in the groove passage and forcibly arranged on the external periphery of the inner ring, and another portion of the torsion spring is elastically arranged on the external periphery of the friction element.

11. The motor for a linear actuator as recited in claim 7, wherein the main body further comprises a fastening element installed in the casing and disposed on one side of the rotating shaft, the fastening element includes an outer ring, and a slot formed in the outer ring, the torsion spring is contained inside the outer ring, and the torsion spring includes a positioning arm fixed into the slot.

12. The motor for a linear actuator as recited in claim 1, wherein the main body includes a casing, and the casing includes an accommodating chamber formed at an end of the casing, and an insertion slot formed in the accommodating chamber, the friction element and the torsion spring are installed in the accommodating chamber, and the torsion spring includes a positioning arm fixed into the insertion slot.

13. A linear actuator comprising:
   a base; and
   a motor comprising:
      a main body fixed to the base;
      a rotating shaft disposed through a center of the main body and extending into the base; and
      a braking mechanism including a friction element and a torsion spring, the friction element being fixedly arranged on the external periphery of the rotating shaft, the torsion spring being arranged to elastically clamp the friction element and having an end fixed to the base;
      wherein the torsion spring forces the friction element to brake and decelerate the rotating shaft by a friction effect between an internal surface of the friction element and a corresponding external surface of the rotating shaft in a radial direction when the rotating shaft rotates in one direction.

14. The linear actuator as recited in claim 13, wherein the friction element includes a cut groove formed thereon.

15. The linear actuator as recited in claim 13, wherein the friction element is comprised of two or more arc plates.

16. The linear actuator as recited in claim 13, wherein the friction element is comprised of two or more stepped arc plates.

17. The linear actuator as recited in claim 13, wherein the friction element includes a coarse pattern formed on its external surface, and the torsion spring is arranged on the coarse pattern.

18. The linear actuator as recited in claim 13, wherein the friction element drives the torsion spring to expand in the radial direction when the rotating shaft in another direction.

19. The linear actuator as recited in claim 13, wherein the base includes a positioning slot formed therein, and the torsion spring includes a positioning arm fixed into the positioning slot.

* * * * *